United States Patent [19]

Hisaki et al.

[11] Patent Number: 4,464,431

[45] Date of Patent: Aug. 7, 1984

[54] FRICTION-MELT RESISTANT TEXTILE PRODUCT AND PREPARING METHOD THEREOF

[75] Inventors: Hisao Hisaki, Shiga; Junnosuke Nagashima, Kusatsu; Katsuo Kanno, Otsu, all of Japan

[73] Assignee: Toray Industries, Inc., Tokyo, Japan

[21] Appl. No.: 516,428

[22] Filed: Jul. 22, 1983

Related U.S. Application Data

[63] Continuation of Ser. No. 382,295, May 26, 1982, abandoned.

[30] Foreign Application Priority Data

Jun. 3, 1981 [JP] Japan .................................. 56-84282

[51] Int. Cl.$^3$ ................................................. B32B 7/00
[52] U.S. Cl. ..................................... 428/266; 427/387; 427/389.9; 428/253; 428/254; 428/423.5; 428/423.7; 428/447; 525/440; 525/453; 525/460

[58] Field of Search ............... 428/245, 253, 254, 265, 428/266, 267, 447; 525/440, 453, 460; 427/387, 389.9, 393.2

[56] References Cited

U.S. PATENT DOCUMENTS 4,350,725  9/1982  Pfluger ................................ 428/266

*Primary Examiner*—James J. Bell
*Attorney, Agent, or Firm*—Wegner & Bretschneider

[57] ABSTRACT

A method of treating a synthetic fiber-containing knitted or woven fabric, wherein a synthetic fiber fabric or a blended fabric of synthetic and other fibers is treated with an aqueous mixture of a hydrophilic and thermally reactive urethane prepolymer with its terminal isocyanate groups blocked and (an) organopolysiloxane. This treatment is good for imparting to thermoplastic synthetic fiber goods a durable effect to prevent melting by sliding friction, and, when applied to the treatment of sportswear, it is useful for protecting players from troubles resulting from melting of clothing by friction caused by sliding attempts.

27 Claims, No Drawings

FRICTION-MELT RESISTANT TEXTILE PRODUCT AND PREPARING METHOD THEREOF

This application is a continuation of U.S. application Ser. No. 382,295, filed May 26, 1982, now abandoned.

FIELD OF THE INVENTION

The present invention relates to a friction-melt resistant textile product and a method of imparting a good hand and at the same time high, durable resistance to melting by sliding friction to woven or knitted fabrics of synthetic fibers or blends containing synthetic fibers.

BACKGROUND OF THE INVENTION

As textile materials for sportswear, synthetic fibers have hitherto been used mainly and widely for their outstanding functional features; sportswear made thereof is now gradually gaining in importance also as homewear or casual wear.

A known problem of such sportswear made of or primarily of synthetic fibers is that when a player falls or slides on the floor of a gymnasium, the resultant impact or instantaneous friction against the floor may cause partial melting of the clothing from the heat of friction to create a hole in it. Synthetic fibers are known to have an innate vulnerability to heat, but it is only recently that this phenomenon was taken up as a serious problem.

As for prevention of such melting by sliding friction of synthetic knitted or woven fabrics, there have been known a number of processing techniques such as the method of blending a cellulosic fiber or inter-knitting or -weaving yarns thereof, of increasing the weight or of lowering surface friction coefficient of the fabric by the use of some textile lubricating agents.

Textile lubricants now used are aqueous emulsions of dimethylpolysiloxane, paraffin wax, aliphatic amide etc. as well as aqueous emulsions of high-melting point waxes. These lubricants are shown in Laid-open Japanese Patent Application Publication Nos. 91994/77, 121600/77, 61800/78 and 80581/80.

Such treatment of knitted or woven fabrics with lubricating agents is effective, indeed, for prevention of melting by sliding friction but this effect is less durable and is lost completely after 2-3 household washings, whereas sportswear which by nature is highly subject to soiling with sweat and dirt or from friction against the floor requires frequent washing, up to dozens of times. Moreover, treatment with textile lubricating agents such as dimethylpolysiloxane has the disadvantage of making the products oily to the touch.

Laid-Open Japanese Patent Application Publication No. 71871/77 shows to use a reactive silicone compound with a melamine derivatives, but this treatment has a disadvantage of making the products too hard.

SUMMARY OF THE INVENTION

The present invention relates generally to a friction-melt resistant product and a method of treating a textile fabric, wherein a knitted or woven fabric solely of synthetic fiber(s) or of blends consisting of synthetic and other fibers is treated with aqueous emulsion of a mixture of a hydrophilic and thermally reactive urethane prepolymer having free isocyanate groups blocked and a organopolysiloxane.

The hydrophilic and thermally reactive urethane prepolymer can be dissolved or dispersed in water together with organopolysiloxane, and when this mixture is applied to textile fabrics, it reacts with the fiber to form a durable organopolysiloxane-containing layer on the surface thereof. This layer, like a pure organopolysiloxane layer, effectively prevents melting by sliding friction and yet is more safe from being washed off easily than said pure organopolysiloxane layer. Textile fabrics treated by this way are useful as materials of sportswear, being effective for protecting players or school children from injuries caused by melting of clothing by sliding friction against the floor when they should slide or fall.

DETAILED DESCRIPTION OF THE INVENTION

The method of the present invention comprises applying to a textile fabric an aqueous mixture comprising organopolysiloxane and a stable aqueous solution of urethane prepolymer with its free isocyanate group blocked and then dissociating the blocking agent by heating, thereby regenerating the active isocyanate groups of the urethane prepolymer so that organopolysiloxane is firmly bound to the fiber over polyurethane. Such hydrophilic and thermally reactive urethane prepolymer with its isocyanate group blocked has an outstanding adhesiveness to the fiber and serves as a sort of binder between organopolysiloxane and the fiber. The organopolysiloxane preferred is one having in it a functional group, especially hydroxyl group or amino group, capable of reacting with the active isocyanate group in the course of its regeneration.

The resulting surface layer thus formed is firmly bound to the fiber substrate so as to be durable for a longer time and has an excellent smoothing effect attributable to organopolysiloxane, markedly lowering the friction coefficient of the fiber. Hence, it shows an outstanding effect to prevent melting by sliding friction.

In the scope of the present invention, the phrase textile product is meant to cover generally knitted and woven fabrics of spun and filament yarns of synthetic thermoplastic fibers such as polyester and polyamide, knitted and woven fibrics of spun and filament yarns vulnerable to rupture by carbonization such as of acrylonitriles, and blended and union-knitted and woven fabrics consisting of high percentages of such fibers blended with natural fibers.

As active hydrogen containing compounds having more than two (preferably more than three) active hydrogen atoms used in the method of the present invention are those having more than two hydroxyl groups, carboxyl groups, amino groups or mercapto groups as terminal or intramolecular groups, such as polyether, polyester and polyether ester, but particularly effective are the polyether type. As such polyethers are known, among others, polymers of alkylene oxides such as ethylene oxide and propylene oxide, styrene oxide, epichlorohydrin etc., and their random or block copolymers or their reacted products with polyhydric alcohols. Of such polyethers, those ranging in average molecular weight from 200 to 20,000, preferably 2,000-3,000, are adequate for the purpose of the present invention as well as for the hand of finishing attainable.

As chain extending agents having active hydrogen atoms, glycols such as ethylene glycol, diethylene glycol, 1,4-butanediol and 1,6-hexanediol, polyhydric alcohols such as glycerin, trimethylolpropane and pentaerythritol, diamines such as ethylene diamine, hexamethylene diamine and piperazine, aminoalcohols such as monoethanol amine and diethanol amine, thiodiglycol such as thiodiethylene glycol and water, can be used.

As polyisocyanates for forming urethane prepolymer through reaction with such active hydrogen-containing compounds can be used, preadded either alone or in combination, aromatic diisocyanates such as isomers of toluilene diisocyanate and 4,4'-diphenylmethane diisocyanate, araliphatic diisocyanates such as xylenediisocyanate, alicyclic isocyanates such as isophorone diisocyanate and 4,4'-dicyclohexylmethane diisocyanate, aliphatic diisocyanates such as hexamethylene diisocyanate, 2,2,4-trimethyl hexamethylene diisocyanate, and trimethylolpropane etc. in combination with any of the above. When the risk of yellowing is to be minimized, especially preferred are araliphatic, alicyclic or aliphatic polyisocyanates.

Such polyurethane prepolymers are formed through reaction of said active hydrogen atom-containing compound with polyisocyanate, for instance, in an inert gas atmosphere in the absence of solvent for 5 minutes to several hours at a temperature of 70°–120° C., preferably 100°–115° C. As catalysts for this reaction may be used an organic metal compounds such as tin dibutyllaurate etc., and it is also possible to add a solvent which is inert to isocyanate group such as acetone, tetrahydrofuran and toluene at a proper step of the process.

As agents for blocking the free isocyanate group of polyurethane prepolymer thus obtained are known, among others, phenols, alcohols, oxymes, lactams, active methylene compounds and bisulfites, but preferred are bisulfites when the relative ease of dissociation, dissociation temperature, desired low-polluting features of dissociation residues and also reactivity with organopolysiloxane are taken into consideration. Bisulfites are, however, substantially soluble only in water, hence the reaction for blocking is required to be conducted in an aqueous medium and, therefore, the urethane substrate is required to be highly hydrophilic, being anionic or nonionic. From a technical point of view, it is considered most advantageous to have contained in the urethane prepolymer nonionic hydrophilic groups with oxyethylene chains. The oxyethylene content in the prepolymer required for blocking of free isocyanate group by the aqueous solution of bisulfite is preferably more than 10 wt. % and less than 40 wt. %. If the content of oxyethylene chain is less than 10 wt. %, the prepolymer becomes too hydrophobic and is quickly separated when it is mixed with the aqueous solution of bisulfite with resultant failure of the blocking reaction and, further, the prepolymer tends to gel, thus interfering with production of the required hydrophilic and reactive urethane compound.

For the introduction of oxyethylene chain into the prepolymer, there are known, for instance, the method of adding as necessary a random or block copolymerized polyether glycol comprising of ethylene oxide and propylene oxide etc. or polyethylene glycol as reaction components for prepolymer synthesis, the method of using polyol synthesized by adding ethylene oxide to preformed polyester, etc.

The method of blocking the free isocyanate group of said prepolymer comprises mixing a solvent solution of said blocking agent with said prepolymer, and stirring the mixture for 5–60 minutes at a temperature of less than 60° C., while preventing the development of heat until the reaction is over.

As to the aqueous solution of bisulfite, it is necessary, depending on the composition of the prepolymer, to reduce the amounts of water as far as possible by increasing the bisulfite concentration. Preferably, the bisulfite content of the solution ought to be less than 3 times the equivalent of free isocyanate groups and its concentration more than 15 wt. %.

The urethane prepolymer composition thus obtained is hydrophilic. The bisulfite blocking agent is dissociated under very mild conditions of heat treatment, regenerating reactive isocyanate groups thereby.

This polyurethane prepolymer composition has contained polymers different in molecular weight, but this distribution in molecular weight does not adversely influence the effect of the present invention. The amount of free isocyanate groups present in said polymers is important to the results of treatment by the method of this invention. The amount of such free isocyanate groups is required to be less than 7 wt. % of the weight of said prepolymer, preferably between 4 and 6%. Another preferred aspect is that the prepolymer should contain at least 1 wt. % of ester group, so as to improve greatly the adhesiveness of the protective layer formed. This is supposed to be due to the cohesive power of the ester group itself or to the formation of hydrogen linkage, although the details of the mechanism still remain unknown. Yet, it is true that compared with where there is no ester group contained in the prepolymer, the adhesive strength of the coating is markedly enhanced if even a very small amount of ester group, say 1 wt. %, is present.

For the introduction of ester group into the prepolymer, it is acceptable to either add polyester polyol as reactant as necessary or use polyester ether.

Organopolysiloxanes effective for attaining a durable finish are those having contained therein a functional group (or groups) capable of reacting with active isocyanate groups as they are regenerated following dissociation of the blocking agent by proper heating after application to the fiber of said blocked urethane composition. As preferred examples thereof may be cited a linear or substantially liner organopolysiloxane having a hydroxyl group attached to the terminal silicon atom. Such organopolysiloxane is required to have an average molecular weight of at least 750 and preferably 20,000–90,000.

As reactants capable of crosslinking reaction with such organopolysiloxane can be used methylhydrogen polysiloxane, ethoxy polysiloxane, alkoxy polysiloxane, polyhydroxy siloxane etc., but preferred is coapplication of methylhydrogen polysiloxane to obtain the higher durability by a three-dimensional crosslinked structure on the fiber surface than that of organosiloxane with terminal hydroxyl groups.

As preferred catalysts are cited according to the present invention, metal salts of carboxylic acid as organic metal compounds such as 2-ethyl-zinc hexonate, zinc caprylate, cobalt naphthenate, stannous caprylate, stannous naphthenate, dibutyl tin dilaurate, di-n-octyl tin diacetate and dibutyl tin diacetate, especially preferred being tin carboxylate. Further applicable organic metal compounds are titanium and zirconium esters and chelate compounds such as titanic tetrabutyl ester, titanic tetraisopropylester and diisopropoxy titanium diester acetoacetate, diorgano tin alkoxides such as dibutyl tin dietoxide and dioctyl tin dimetoxide, and diacyl polydiorganostannoxanes such as diacetoxy tetraalkyldistannoxane. The ratio of the amount used of catalyst to that of organopolysiloxane is variable over a wide range of 0.1-30 wt. %, but generally preferred range is 5-20 wt. %.

As mentioned above, good results of treatment are attainable by the use of an aqueous mixture of hydrophilic and thermally reactive urethane composition and organopolysiloxane. The result attainable in a two-step mode of treatment, in which hydrophilic and thermally reactive urethane composition is first applied to the woven or knitted fabric to be treated and then organopolysiloxane in a separate step, is not so good as in the abovementioned simultaneous treatment.

It is believed that this is because, when a blocked, hydrophilic and thermally reactive urethane composition is first applied, the blocking agent is dissociated by heating to allow regeneration of active isocyanate groups and through progress of reaction therebetween is formed on the fiber a film or layer of crosslinked structure, hence the treatment in the second step with organopolysiloxane fails to produce any durable effect as the active isocyanate group for reaction therewith is already lost.

Hence, according to the present invention, the basic method of treatment is by the use of a mixed solution of a blocked hydrophilic and thermally reactive urethane composition and organopolysiloxane, but very important is proper control of the amounts used thereof. For instance, when the amount used of the blocked hydrophilic and thermally reactive urethane composition which serves as a sort of binder to the fiber is extremely small, durable finish is not attainable due to lack of the adhesiveness to the fiber, to say nothing of its insufficient reactivity with organopolysiloxane; whereas, when the amount is excessive, the hand of the finished fabric becomes too stiff because of the high resiliency thereof, while the durability of the finish is ample, hence it is to be controlled at least in a range of 0.05-1.5%, preferably 0.1-0.5%, based on the weight of the fiber. The organopolysiloxane reacts with the active isocyanate groups of the urethane under a proper heat treatment, when an organic metal compound is used as catalyst, to produce a finish of outstanding durability and performance to prevent melting by sliding friction, but for that required is application of at least 0.2-2.0% o.w.f., preferably 0.4-1.0%. As an organopolysiloxane used with the organopolysiloxane capable of reacting with the active isocyanate group to form crosslinkage is known typically methylhydrogen polysiloxane, which though providing a less favorable effect for prevention of melting by sliding friction, is used for further improving the durability of the finish, and the ratio of its amount to that of said organopolysiloxane is required to be less than 20 wt. %, preferably 5-10 wt. %.

Thus, by application of a mixed solution so adjusted with addition of a proper amount of organic metal compound as catalyst to the fabric to be treated and subsequent heat treatment, a finish effective for prevention of melting by sliding friction highly durable and excellent in hand imparted to the fabric. If necessary, it is also possible to add this mixed solution to other hand improvers and antistatic agents in quantities not to cause lowering of its performance.

As method of application can be employed any of the generally practiced methods such as padding, spraying or coating or screen coating etc., but this is not to be interpreted as limiting statement, and, if necessary, it is also possible to apply the liquor to one side of the fabric only. After application of the treating liquor to the fabric by any of above mentioned applicating means, heat treatment is given after preliminary drying (pre-dry) or immediately without pre-dry depending on the pick-up of the treating liquor. The drying temperature is required to be at least 50° C., the preferred range being 80°-120° C. Preferred is drying at a temperature as low as possible, when dyeing fastnesses of the fabric are taken into consideration, but recommended conditions of heat treatment are 20-90 seconds, preferably 30-40 seconds, at 120°-180° C., preferably 140°-160° C.

For quantitative determination of the free NCO group of the urethane prepolymer, there was adopted the following method.
(1) 1.0-1.5 g of the prepolymer is weighed out precisely.
(2) It is dissolved in a mixed solution of toluene and ethyl acetate (volume ratio 1:1).
(3) 25 ml of 0.1N n-dibutylamine is added to it, and then the mixture is stirred for 15 minutes.
(4) Approx. 100 ml of isopropyl alcohol is further added for dilution.
(5) A few drops of Bromo Phenol Blue are added as indicator, and the remaining amine is titrated with 0.1N HCl with the time of change of the liquor's color to yellowish green as the end point.
(6) Calculation formula $$\text{Free NCO} = \frac{0.42 \times C}{S} \times (B - A)$$

where:
C = Factor of 0.1N HCl
B = Quantity in ml of 0.1N HCl consumed in bland titration.
A = Quantity in ml of 0.1N HCl consumed in titration of the sample.
S = Quantity of the sample taken.

Exemplary embodiments of the present invention are set forth below as nonlimiting explanations. Other embodiments and equivalents of the invention hereof will be apparent to persons skilled in the art upon reading this specification.

EMBODIMENT 1, COMPARISON 1

Dyed interlock jersey (22-gauge) (fabric weight 280 g/m$^2$) of polyester textured yarn (150 denier/48 filaments) was dipped in a bath of aqueous mixture containing 1.0 wt. % of aqueous solution of a hydrophilic and thermally reactive urethane (effective ingredient 22%) of the polyether type (3-functional) containing 5.02% as actually measured of free isocyanate group, 3.0 wt. % of emulsion (effective ingredient 40%) of dimethylpolysiloxane with its chain carrying hydroxyl groups at both ends thereof (viscosity: 1,000 cst.) and 0.6 wt. % of a tin catalyst, squeezed by mangle to a pick-up of 104%, dried for 5 minutes at 120° C. and cured for 1 minute at 160° C.

The fabric so treated was brought into contact with a wooden roll (made of cherry wood) revolving at a speed of 1,400 r.p.m. with a surface speed of 7 m/min. with contact pressure adjusted to 1.0 kg and the time until a hole was made from melting by friction was measured by stopwatch.

The same measurement was applied to the same fabric after 30 cycles of repeated washing, one cycle consisting of washing for 5 minutes at 40° C. with 2 g/l solution of the commercially available detergent "Zab"

(Kao Atras Co.) and subsequent rinsing and spin-drying.

In comparison 1 a sample of the same jersey described above in Embodiment 1 was treated in the same way using a treating liquor only containing 3.0 wt. % of emulsion (effective ingredient 40%) of dimethylpolysiloxane with its chain carrying hydroxyl groups at both ends thereof (viscosity: 1,000 cst.) and measurement was taken of the finished sample also in the same way.

As seen from the table below, the finished sample was seen excellent in durability of the finish as well as in hand.

|  | Embodiment 1 | Comparison 1 | Control (untreated) |
|---|---|---|---|
| Before washing | 50 sec. | 50 sec. | 2 sec. |
| After washing | 50 sec. | 5 sec. | — |
| Hand (before washing) | Less slippery | Very slippery |  |

EMBODIMENT 2

As material was used a sample of the same jersey described in Embodiment 1, and it was dipped in a bath of aqueous mixture containing 2.0 wt. % of aqueous solution of a hydrophilic and thermally reactive urethane (effective ingredient 17%) of the polyether type containing 4.50% as actually measured of free isocyanate group, 1.8 wt. % of emulsion (effective ingredient 40%) of dimethylpolysiloxane with its chain carrying hydroxyl groups at both ends thereof (viscosity: 1,000 cst.), 0.2 wt. % of methylhydrogen polysiloxane (effective ingredient 40%) and 0.4 wt. % of a tin catalyst, squeezed by mangle to a pick-up of 104%, dried for 5 minutes at 120° C. and cured for 1 minute at 160° C.

Measurement was taken of the treated sample in the same way as described in Embodiment 1 and the result showed that the time required for melting by sliding friction was 45 seconds even after washing, the treated sample being less slippery and the durability of the finish being excellent.

EMBODIMENT 3

Dyed interlock jersey (22-gauge) (fabric weight 290 g/m$^2$) of Nylon 66 "Promilan" (Toray) textured yarn (120 denier/36 filaments) was dipped in a bath of aqueous mixture containing 5.0 wt. % of aqueous solution of a hydrophilic and thermally reactive urethane (effective ingredient 22%) of the polyether type containing 5.02% as actually measured of free isocyanate group, 4.5 wt. % of emulsion (effective ingredient 40%) of dimethylpolysiloxane with its chain carrying hydroxyl groups at both ends thereof (viscosity: 1,000 cst.), 0.5 wt. % of methylhydrogen polysiloxane (effective ingredient 40%) and 1.0 wt. % of a tin catalyst, squeezed by mangle to a pick-up of 108%, dried for 5 minutes at 120° C. and cured for 1 minute at 160° C.

Measurement was taken of the treated sample in the same way as described in Embodiment 1 and the result showed that the time required for melting by sliding friction was 60 seconds even after washing (8 seconds with untreated control), the durability of the finish being thus excellent.

EMBODIMENT 4

Dyed interlock stitch fabric (22-gauge) (fabric weight 350 g/m$^2$) of acrylic fiber "Torayron" (Toray)/wool mixed yarn (blending ratio 80/20) was dipped in a bath of aqueous mixture containing 5.0 wt. % of aqueous solution of a hydrophilic and thermally reactive urethane (effective ingredient 22%) of the polyether type containing 5.02% as actually measured of free isocyanate group, 5.0 wt. % of emulsion (effective ingredient 40%) of dimethylpolysiloxane with its chain carrying hydroxyl groups at both ends thereof (viscosity: 1,000 cst.) and 1.0 wt. % of a tin catalyst, squeezed by mangle to a pick-up of 120%, dried for 5 minutes at 120° C. and cured for 1 minute at 140° C.

Measurement was taken of the treated sample in the same way as described in Embodiment 1 and the result showed that the time required for melting by sliding friction was 50 seconds even after washing (as against 8 seconds with untreated control), the durability of the finish being thus excellent and also excellent being the hand of the treated sample with good resiliency.

EMBODIMENT 5

Dyed reversible jersey knitted of polyester textured yarn for the surface and of cotton yarn for the back (fabric weight 290 g/m$^2$) was coated in the surface with an aqueous mixture containing 10 wt. % of aqueous solution of a hydrophilic and thermally reactive urethane (effective ingredient 22%) of the polyether type containing 5.02% as actually measured of free isocyanate group, 10 wt. % of emulsion (effective ingredient 40%) of dimethyl polysiloxane with its chain carrying hydroxyl groups at both ends thereof (viscosity: 1,000 cst.) and 2 wt. % of a tin catalyst, using a gravure coating machine at a pick-up of 20%, dried for 5 minutes at 120° C. and then cured for 1 minute at 160° C.

Measurement was taken of the treated sample in the same way as described in Embodiment 1 and the result showed that the time required for melting by sliding friction was 60 seconds even after washing (as against 12 seconds with untreated control), the durability of the finish being thus excellent keeping the good absorbency of the back surface of the fabric.

COMPARISON 2

Dyed interlock jersey (fabric weight 280 g/m$^2$) of polyester textured yarn (150 denier/48 filaments) was dipped in a bath of 2.0% aqueous solution of a blocked polyether-type urethane prepolymer (effective ingredient 22%) containing 5.13% as actually measured of free isocyanate group, squeezed by mangle to a pick-up of 108%, dried for 5 minutes at 120° C. and then cured for 1 minute at 160° C.

Measurement was taken of the treated sample in the same way as described in Embodiment 1 and the result showed that the time required for melting by sliding friction was the same as with the untreated control, no effect of the treatment in this respect thus being recognizable.

EMBODIMENT 6

A sample of the same jersey described in Embodiment 1 was treated in the same way as in Embodiment 1 using aqueous mixtures containing 2 wt. % of aqueous solutions of two different types of blocked polyether-type isocyanate, shown as A and B in the table below, 3 wt. % of emulsion (effective ingredient 40%) of dimethylpolysiloxane with its chain carrying hydroxyl groups at both ends thereof and an organic tin compound as catalyst.

|   | Free NCO (%) | Effective ingredient (%) |
| --- | --- | --- |
| A Trifunctional compound | 5.02 | 22 |
| B Bifunctional compound | 4.50 | 17 |

The result of measurement of the time required for melting by sliding friction is shown in the table below.

|   | Before washing | After washing (30 cycles) |
| --- | --- | --- |
| Aq. mixture A | 50 sec. | 45 sec. |
| Aq. mixture B | 50 sec. | 30 sec. |

As seen from the above result, the durability of the finish was better with the trifunctional compound of type A than with the bifunctional compound of type B.

EMBODIMENT 7

A dyed sample of interlock jersey of polyester textured yarn (fabric weight 280 g/m$^2$) was dipped in a bath of aqueous mixture containing 2 wt. % of aqueous solution of a blocked polyester-type isocyanate addition polymer (effective ingredient 17%) containing 3.76% of free isocyanate group, 3 wt. % of emulsion (effective ingredient 40%) of dimethylpolysiloxane with its chain carrying hydroxyl groups at both ends thereof and an organic tin compound as catalyst, squeezed by mangle to a pick-up of 118%, dried for 5 minutes at 120° C. and then cured for 1 minute at 160° C.

Measurement was taken of the treated sample in the same way as described in Embodiment 1 and the result showed that the time required for melting by sliding friction was as long as 60 seconds before washing but it was 20 seconds after washing of only 5 cycles, thus the durability of the finish being not satisfactory.

COMPARISON 3

A sample of the same jersey as used in Embodiment 1 was dipped in a bath of aqueous mixture containing 1.0 wt. % of aqueous solution (effective ingredient 22%) of a hydrophilic and thermally reactive urethane of the polyether type (trifunctional) containing 5.02% as actually measured of free isocyanate group and 0.3 wt. % of a tin catalyst, squeezed by mangle to a pick-up of 104%, dried for 5 minutes at 120° C. and then dipped in another bath of aqueous mixture containing 3.0 wt. % of emulsion (effective ingredient 40%) of dimethyl polysiloxane with its chain carrying hydroxyl groups at both ends thereof (viscosity: 1,000 cst.) and 0.6 wt. % of thin catalyst, squeezed by mangle to a pick-up of 104%, dried for 5 minutes at 120° C. and then cured for 1 minute at 160° C.

Measurement was taken of the treated sample in the same way as described in Embodiment 1 and the result showed that the time required for melting by sliding friction was 20 seconds before washing as well as after 18 cycles of washing, the finish thus showing little effect in this respect.

EMBODIMENT 8

The same jersey described in Embodiment 1 was dipped into three type of aqueous mixture containing 0.5 wt. % of aqeous solution of a hydrophilic and thermally reactive urethane prepolymer (effective ingredient 40%) of the polyester type A or B or C, 1.8% of emulsion (effective ingredient 40%) of dimethylpolysiloxane having hydroxyl groups at both ends thereof (viscosity: 1,000 cst.), 0.2 wt% of emulsion (effective ingredient 40%) of methylhydrogen polysiloxane and 0.4% of a tin catalyst respectively, squeezed by mangle to a pick-up of 104%, dried for 5 minutes at 120° C. and then cured for 1 minute at 160° C.

|   | Free NCO (%) | Ester Group (%) |
| --- | --- | --- |
| Prepolymer A | 5.70 | 0 |
| Prepolymer B | 5.73 | 0.58 |
| Prepolymer C | 5.84 | 1.20 |

Measurements were taken of the treated samples in the same way as described in Embodiment 1 and the times required for melting by friction is shown in the table below.

|   | Before Washing (sec.) | After 30 Cycles of Washing (sec.) |
| --- | --- | --- |
| Prepolymer A | 50 | 30 |
| Prepolymer B | 50 | 35 |
| Prepolymer C | 45 | 45 |

As seen from the above results, the durability of the finish was much better with containing ester group of at least 1.0wt.% in the prepolymer than with containing no ester group.

What is claimed is:

1. A method of treating a textile fabric, wherein a synthetic filter fabric or a blended fabric of synthetic and other fibers is treated with an aqueous mixture of a hydrophilic and thermally reactive urethane prepolymer having a blocked isocyanate group and organopolysiloxane.

2. A method of treating a textile fabris as recited in claim 1, wherein said synthetic fiber is a polyester fiber.

3. A method of treating a textile fabric as recited in claim 1, wherein said synthetic fiber is a polyamide fiber.

4. A method of treating a textile fabric as recited in claim 1, wherein said urethane prepolymer contains more than three isocyanate groups.

5. A method of treating a textile fabric as recited in claim 1, wherein said organopolysiloxane is a reactive organopolysiloxane.

6. A method of treating a textile fabric as recited in claim 1, wherein said organopolysiloxane is a hydroxyl group-containing organopolysiloxane.

7. A method of treating a textile fabric as recited in claim 1, wherein said organopolysiloxane is an amino group-containing organopolysiloxane.

8. A method of treating a textile fabric as recited in claim 1, wherein said urethane prepolymer is an urethane prepolymer of the polyether type.

9. A method of treating a textile fabric as recited in claim 1, wherein said urethane prepolymer is an urethane prepolymer of the polyester type.

10. A method of treating a textile fabric as recited in claim 1, wherein said organopolysiloxane is an organopolysiloxane of the dimethyl polysiloxane type.

11. A method of treating a textile fabric as recited in claim 1, wherein the blocked isocyanate content of said urethane prepolymer is more than 5 weight percent.

12. A method of treating a textile fabric as recited in claim 1, wherein the blocked isocyanate content of said urethane prepolymer is more than 4 weight percent.

13. A method of treating a textile fabric as recited in claim 1, wherein the amount applied of said urethane prepolymer is 0.05 to 1.5 weight percent.

14. A method of treating a textile fabric as recited in claim 1, wherein the amount applied of said urethane prepolymer is 0.1 to 0.5 weight percent.

15. A method of treating a textile fabric as recited in claim 1, wherein the amount applied of said organopolysiloxane is 0.2–2.0 weight percent.

16. A method of treating a textile fabric as recited in claim 1, wherein the amount applied of said organopolysiloxane is 0.4–1.0 weight percent.

17. A textile article of manufacture, comprising:
(a) a synthetic or blend fiber, and
(b) a polymer layer on the surface of said fiber, comprising the reaction product of
(1) a polyurethane and
(2) a polyorganosiloxane.

18. A textile article of claim 17, wherein said synthetic fiber is a polyester.

19. The textile article of claim 17, wherein said synthetic fiber is a polyamide.

20. The textile article of claim 17, wherein said reaction product is a cross-linked polymer layer.

21. The textile article of claim 17, wherein said polyurethane is a polyester.

22. The textile article of claim 17, wherein said polyurethane is a polyether.

23. The textile article of claim 17, wherein said polyorganosiloxane is a dimethyl polysiloxane.

24. The textile article of claim 17, wherein the amount of said polyurethane is 0.05 to 1.5 weight percent based on said textile article of manufacture.

25. The textile article of claim 17, wherein the amount of said polyurethane is 0.1 to 0.5 weight percent based on said textile article.

26. The textile article of claim 17, wherein the amount of said polyorganosiloxane is 0.2 to 2.0 weight percent based on said textile article of manufacture.

27. The textile article of claim 17, wherein the amount of said polyorganosiloxane monomer is 0.4 to 1.0 weight percent based on said textile article of manufacture.

* * * * *